(12) United States Patent
Hausladen et al.

(10) Patent No.: US 9,840,404 B2
(45) Date of Patent: Dec. 12, 2017

(54) MODULAR PRODUCTION SYSTEM AND METHOD FOR PRODUCING AND/OR FILLING CONTAINERS

(71) Applicant: KRONES AG, Neutraubling (DE)

(72) Inventors: Wolfgang Hausladen, Neutraubling (DE); Christian Stoiber, Neutraubling (DE); Wolfgang Hahn, Neutraubling (DE); Alexander Kaiser, Neutraubling (DE); Markus Zoelfl, Neutraubling (DE); Frank Winzinger, Neutraubling (DE); Stefan Raith, Neutraubling (DE)

(73) Assignee: KRONES AG, Neutraubling (DE)

( * ) Notice: Subject to any disclaimer, the term of this patent is extended or adjusted under 35 U.S.C. 154(b) by 272 days.

(21) Appl. No.: 14/416,721

(22) PCT Filed: Jul. 3, 2013

(86) PCT No.: PCT/EP2013/064057
§ 371 (c)(1),
(2) Date: Jan. 23, 2015

(87) PCT Pub. No.: WO2014/016091
PCT Pub. Date: Jan. 30, 2014

(65) Prior Publication Data
US 2015/0197415 A1 Jul. 16, 2015

(30) Foreign Application Priority Data
Jul. 23, 2012 (DE) .................. 10 2012 212 882

(51) Int. Cl.
*B65B 31/00* (2006.01)
*B67C 3/24* (2006.01)
(Continued)

(52) U.S. Cl.
CPC .............. *B67C 3/24* (2013.01); *B25J 11/00* (2013.01); *B29C 31/002* (2013.01);
(Continued)

(58) Field of Classification Search
CPC ....... B67C 3/24; B67C 7/0053; B67C 7/0006; B29C 31/002; B29C 49/4205; B29C 49/06; B25J 11/00; B29L 2031/7158
See application file for complete search history.

(56) References Cited

U.S. PATENT DOCUMENTS 2,085,410 A 6/1937 Bergmann
2,215,702 A 9/1940 Holm
(Continued)

FOREIGN PATENT DOCUMENTS

CN 102009931 A 4/2011
CN 102202991 A 9/2011
(Continued)

OTHER PUBLICATIONS

"PET Technology for the markets of tomorrow" Krones AG, Sep. 1, 2004, XP002715065.
"Used Machines, Sidel SBO 1", Sidel Group, 1995, XP002715066.

*Primary Examiner* — Jason K Niesz
(74) *Attorney, Agent, or Firm* — Leydig, Voit & Mayer, Ltd.

(57) ABSTRACT

A production system for producing and/or filling containers, including beverage bottles, includes modular processing units. Each of the modular processing units includes a stationary operating module configured to produce or process the containers and handling devices. The handling devices are configured to handle the containers between a container entry of the processing unit and a container exit of the processing unit and to position the containers in the operating module. The handling devices are configured such that the processing units are individually replaceable. Alternatively or additionally to this, at least two processing units of a same kind are provided to which the containers are specifically distributable.

11 Claims, 19 Drawing Sheets

(51) Int. Cl.
  *B29C 49/42* (2006.01)
  *B67C 7/00* (2006.01)
  *B25J 11/00* (2006.01)
  *B29C 31/00* (2006.01)
  *B29C 49/06* (2006.01)
  *B29L 31/00* (2006.01)

(52) U.S. Cl.
  CPC ........ *B29C 49/4205* (2013.01); *B67C 7/0006* (2013.01); *B67C 7/0053* (2013.01); *B29C 49/06* (2013.01); *B29L 2031/7158* (2013.01)

(56) References Cited

U.S. PATENT DOCUMENTS

| | | | |
|---|---|---|---|
| 4,511,027 | A | 4/1985 | Zamboni |
| 4,927,205 | A | 5/1990 | Bowler et al. |
| 6,332,484 | B1 | 12/2001 | Stahlecker et al. |
| 2006/0150578 | A1 | 7/2006 | Zwilling |
| 2008/0134633 | A1 | 6/2008 | Willing |
| 2009/0000909 | A1 | 1/2009 | Hollriegl et al. |
| 2011/0056172 | A1 | 3/2011 | Klenk et al. |
| 2011/0197995 | A1 | 8/2011 | Bodtlaender |

FOREIGN PATENT DOCUMENTS

| | | |
|---|---|---|
| DE | 204638 C | 11/1908 |
| DE | 3238332 A1 | 6/1983 |
| DE | 19921274 A1 | 11/2000 |
| DE | 10154203 A1 | 6/2002 |
| DE | 10322556 A1 | 4/2004 |
| DE | 102004055098 A1 | 5/2004 |
| DE | 102005015565 A1 | 10/2006 |
| DE | 102006023531 A1 | 11/2007 |
| EP | 0414031 A1 | 2/1991 |
| EP | 1449778 A1 | 8/2004 |
| EP | 1645340 A1 | 4/2006 |
| EP | 2292550 A1 | 3/2011 |
| EP | 2471728 A1 | 7/2012 |
| WO | 2010081512 A1 | 7/2010 |
| WO | 2011027372 A1 | 3/2011 |

MODULAR PRODUCTION SYSTEM AND METHOD FOR PRODUCING AND/OR FILLING CONTAINERS

CROSS-REFERENCE TO PRIOR APPLICATIONS

This application is a U.S. National Phase Application under 35 U.S.C. §371 of International Application No. PCT/EP2013/064057, filed on Jul. 3, 2013, and claims benefit to German Patent Application No. DE 10 2012 212 882.4, filed on Jul. 23, 2012. The International Application was published in German on Jan. 30, 2014 as WO 2014/016091 under PCT Article 21(2).

FIELD

The invention relates to a production system for producing and/or filling containers, in particular beverage bottles, and to a method for producing and/or filling containers in the production system.

BACKGROUND

Individual processing steps are in filling systems known to be associated with separate handling units that can be assembled, for example, as modules of a joint system concept. Interfaces for controlling the system, for media supply or the like, are commonly standardized to facilitate the combination of handling units of different types and/or production capacities and to thereby reduce costs for the acquisition and operation of the systems.

In addition, however, there is a growing need for flexible system concepts in order to be able to produce different products with the best possible capacity utilization even with frequent product changes. Interruptions in production during product changes or maintenance measures should likewise be minimized.

SUMMARY

In an embodiment, the present invention provides a production system for producing and/or filling containers, including beverage bottles. The production system includes modular processing units. Each of the modular processing units includes a stationary operating module configured to produce or process the containers and handling devices. The handling devices are configured to handle the containers between a container entry of the processing unit and a container exit of the processing unit and to position the containers in the operating module. The handling devices are configured such that the processing units are individually replaceable. Alternatively or additionally to this, at least two processing units of a same kind are provided to which the containers are specifically distributable.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
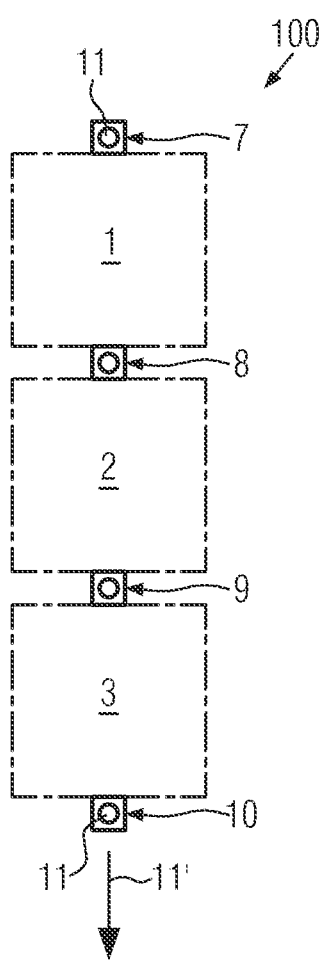
FIG. 1 shows a production system with processing units linked according to an embodiment of the invention in a schematic plan view.

In an embodiment, the present invention provides a production system comprising multiple modular processing units, each having at least one stationary operating module for producing or processing the containers and additionally with handling devices for handling the containers between a container entry of the processing unit and a container exit of the processing unit and for positioning the containers in the operating module. The handling devices are configured such that the processing units can be individually replaced, and/or there are at least two processing units of the same kind provided, to which the containers can be selectively distributed.

The handling devices can be an integral part of the processing units, i.e. be mounted, for example, fixedly on them. It is also possible to configure the handling devices as modules. They are then mounted replaceably on the processing units.

The modules according to an embodiment of the invention are defined, for example, in that they are mounted as operational units, for the operation of which only supply lines and/or communication lines must be connected.

Containers within the meaning of the invention are in particular beverage bottles and other containers for food, medicines, toiletries, detergents or the like. Containers made of plastic also comprise intermediate products, in particular preforms for stretch blow molding the containers.

The stationary operating modules of an embodiment of the invention differ in particular from operating modules of the rotary machine kind in that the containers during treatment do not circulate along a pitch circle. The container could in the stationary operating modules, however, perform linear motions, for example, along their main axis, and/or perform rotational motions, for example, about their main axis.

Individual replacement of the processing units is to be understood in that they can be substantially dismantled and assembled as a whole with respect to a predetermined mounting platform, a mounting grid or the like.

Handling is to be understood as the provision of the containers for the individual work steps, where the handling devices themselves do not effect any treatment of the containers, but can hold and/or move the containers during processing. Handling preferably occurs as neck handling.

One configuration of the handling devices according to the invention is, for example, that uniform and/or corresponding interfaces for container transfer between processing units are formed between handling devices of adjacent processing units. The position of the interfaces with respect to a predetermined mounting grid can also be aligned uniformly and/or linearly along a main direction of transport of the containers. The interfaces preferably correspond substantially to the container entries and container exits of the processing units.

Selective distribution of the containers is understood to be the distribution of the associated product flow to partial product flows by use of gates or the like, as well as merging partial product flows.

In one preferred embodiment, a handling device at the entry side is provided for receiving the containers at the container entry and for inserting the containers into the operating module as well as a handling device at the exit side for removing the containers from the operating module and for transferring the containers at the container exit. Both handling devices are in particular controllable individually. The handling device at the entry side can then immediately after insertion of the containers into the operating module be moved back again to the container entry. Similarly, the handling device at the exit side can after completion of the work step selectively take up the container and move it to the container exit. The loss of time for handling the containers can thereby be minimized. The operating module can again be loaded immediately after removal of the treated container.

Preferably, the handling devices are designed as clocked gripping units that can each move between a gripping position in the region of the operating module and a gripping position at the entry side or a gripping position at the exit side. Particularly suitable are pivotal motions or linear motions of gripping arms with active grippers. They are easy to move to and fro between defined end positions. The gripping positions at the entry side and the exit side preferably define the container position at transfer interfaces between adjacent handling units or relative to distribution modules according to the invention. The grippers can also perform the gripping functions merely passively, for example, by being equipped with a spring that forces two gripping claws to a gripping position. Regardless of the active or passive operation of the gripper, the motions of the associated gripping arm can be controlled actively about at least one axis. Active control about two or even more axes is also possible—depending on the process for the container.

In another preferred embodiment, a rail-like handling device is provided extending from the container entry to the container exit, and the processing unit is at least temporarily associated with at least one separately driven handling device which can be moved along the rail-like handling device in a guided manner and with which the container can be positioned in the operating module in particular during the guided motion.

The rail-like handling device can be composed of any guide elements, such as guide profiles, railings or the like, provided a continuous motion of individually driven handling devices is ensured across interfaces with adjacent processing units or distribution modules.

The individually driven handling devices are configured as vehicles, such as carriage, shuttles or the like. They are temporarily associated with respective processing units, for example, while the containers are positioned in the associated operating module. Preferably, at least the same number of individually driven handling devices is provided as processing units with rail-like handling devices.

The rail-like handling device can be composed of a magnetic linear drive with a plurality of coils arranged on a rail for driving the vehicles. The vehicles can for this be equipped with permanent magnets or iron cores which cooperate with the magnetic fields generated by the coils to drive the vehicles. In addition, the vehicles can from a line disposed on or in the rail receive electrical energy which can drive the gripping arms and/or grippers disposed on the vehicles.

In another embodiment, a production system is provided for producing and/or filling containers, in particular beverage bottles, with modular processing units, each comprising: at least one stationary operating module for producing or processing the containers; and handling devices for handling the containers between a container entry of the processing unit and a container exit of the processing unit and for positioning the containers in the operating module, where the handling devices comprise movable gripping units between the container entry and the container exit with in particular pivotably mounted gripping arms of variable length to hold the containers in the region of the operating modules when moving the gripping units, in particular at a constant position relative to the operating modules.

The length of the gripping arms is there defined with respect to their support on the handling device. The gripping arms can, for example, be formed in a telescopic manner or be movable with respect to their support in the sense of a linear carriage. This enables acceleration or deceleration of the containers during removal from operating modules or during insertion into operating modules—in addition to or as an alternative to the motion of the vehicle.

The gripping units preferably comprise grippers for positive-fit gripping of a neck portion of the containers, in particular such that the container being held is mounted rotatable about its longitudinal axis in the gripper. This allows holding the container in the operating module in a rotational position that is constant relative to the operating module, while the driven handling device moves on. A positive fit is to be understood such that the container is defined in the gripper with respect to its position, but not with respect to its rotational position. However, the grippers can also for force-fit gripping of the container, in particular in the neck region, be configured with a rotational position fixed with respect thereto, depending on the work step to be performed. The grippers are preferably actively controllable, in particular so as to enable the containers to be gripped both in a positive-fit and a force-fit manner. The handling devices are then suitable in combination with respectively different operating modules.

Grippers are preferably mounted pivotably on the gripping arms, in particular such that the gripping arms and the grippers can be pivoted separately about axes of rotation that are parallel to each other. The containers can then, when the handling devices being configured as vehicles move on, be held in a constant position relative to the operating modules and rotate with respect to the gripping arm and/or of the operating module. Complex motions of the container relative to the operating modules can likewise be implemented, for example, for partial or total circumferential labeling or respective printing onto the container. Printing is preferably done digitally with one or more print heads.

In a favorable embodiment, the rail-like handling devices are in the region of the operating modules formed curve-like. A curved portion can in particular be formed convex with respect to the operating module. The motions of the gripping arms needed for suitable positioning of the containers in the module can thereby be simplified.

A particularly advantageous embodiment further comprises at least one distribution module between processing units provided for various work Steps, with which a product flow formed by the containers can be distributed to at least two partial product flows or two partial product flows formed by the containers can be merged. This allows for better utilization of the capacity of the production system. The distribution modules distribute the containers preferably in a secondary direction of transport transverse to the main direction of transport of containers through the production system. With a linear arrangement of the processing units, the secondary direction of transport is preferably, in particular in the lateral direction, orthogonal to the main direction of transport of the containers. The concept of distributing there also comprises merging containers to one product flow.

Two separately driven transport devices are provided on the distribution module, each having at least one row of grippers attached thereto for receiving and transferring the containers, where the grippers of the two transport devices can be moved to identical interface positions for reception/transfer from/to the processing units. The grippers of the one transport device can therewith load themselves with containers on the entry side, whereas the grippers of the other transport device can at the exit side distribute containers to processing units. This allows quasi-continuous distribution of the containers by alternately loading the one or the other transport device. The transport devices distribute the containers transverse to the main direction of transport of containers. Multiple reception interfaces and/or transfer interfaces are therefore provided at the distribution module transverse to the main direction of transport. Product flows can thereby be separated, merged and/or selectively distributed. It would in principle also be possible to provide only a single gripper on each transport device.

Two circulating transport devices are preferably provided on the distribution module, each having at least one row of grippers attached thereto for receiving/transferring the containers, where a respective run on the entry side of the transport devices and a respective run on the exit side of the transport devices are provided disposed one above the other such that the rows of grippers can successively be moved to identical interface positions. The gripper rows can therefore alternately be driven to identical interface positions for receiving or transferring the containers. The grippers are there preferably configured such that they receive the containers at the interfaces in the same vertical position and/or can transfer them in the same vertical position. Height-adjustable grippers can also be provided for this. The transport devices can be configured, for example, as a toothed belt, a chain or the like.

An advantageous embodiment further comprises a mobile operating module for a first work step with a predetermined work process period that can be consecutively coupled to processing units for a second work step with a longer work process period as compared thereto, in order to perform the first work step during the second work step consecutively for at least two containers.

The process period for the second work step can thereby be used particularly efficiently and the number of operating modules for the first work step can be reduced while simultaneously having an efficient process design. The first work step is in particular performed in a different container region than the second work step. For example, a combination is conceivable of a mobile labeling assembly for a container side wall with a relatively short process period at a filling valve with a comparatively long process period. The labeling assembly can there move to several filling stations.

For example, two bottles can be filled simultaneously in two filling units, while the mobile labeling assembly during this time labels both bottles in that it consecutively automatically moves to the two filling units. In this way, one labeling assembly could be saved as compared to a configuration in which each filling unit is assigned its own labeling assembly. At the same time, room in the production hall can be saved since separate labeling is no longer needed elsewhere, for example, in the merged product flow after filling. This principle can be applied to a variety of processes at other operating modules, for example, with inmold-labeling in stationary blow modules or at mobile heating unit for heating plastic preforms in stationary sterilization modules, or vice versa: at stationary heating modules with mobile sterilization modules. Mobile inspection units are also conceivable which inspect the containers during other processing steps. The mobile operating module can be ordered on demand by other operating modules. Docking elements can further be provided on the stationary operating modules in order be able to accurately position the mobile operating module.

In a further embodiment, the present invention provides a method for producing and/or filling containers, in particular beverage bottles, in the production system according to embodiments of the invention, wherein the containers are distributed from a processing unit for a first work step with a first work process period to multiple processing units for a second work step with a second work process period that is longer as compared thereto. A change of direction in terms of combining container flows prior to a comparatively fast process is also comprised. Processing units with differing product output can thereby be efficiently connected in series, thereby maximizing the production capacity of the system as a whole.

At least one first processing unit is preferably provided for the first work step with a first work process period and at least one second processing unit, in particular connected parallel thereto, for the first work step with a second work process period that is longer than the first work process period. The containers are then for the second work step in a weighted manner depending on the process period for the first work step distributed to the processing units to equalize the degree of capacity utilization of the processing units for the second work step. In other words, the respectively shorter work process period allows for higher machine output, so that more containers can be processed per unit time in the first work step and distributed to subsequent processing units for the second work step.

Weighting can be flexibly adapted, for example, depending on the product. This is in contrast to a fixed allocation in terms of a series connection of the processing units without separations for the first and second work step. The production capacity of the system can thereby overall be better utilized.

Different work process periods in the first work step can occur, for example, when processing different products, such as when filling different beverages. For example, the products from the slower filling process can then be distributed to fewer subsequent processing units than the products from the faster filling process. The variable distribution of containers can also be performed in the opposite direction within the meaning of selectively merging product flows, i.e. in a transition from relatively slow processes to relatively fast processes that require a smaller number of processing units. The containers are then preferentially fed to the processing unit that can perform the respective work process faster. For example, a low viscosity beverage can be filled faster than a high viscosity beverage. The filling station with the low viscosity beverage is then loaded with preference, i.e. with more containers per unit time than the filling station with the high viscosity beverage.

This flexible weighting and guiding of parallel partial product flows can be performed in the opposite direction, i.e. when merging several comparatively slow treatment steps to comparatively fast treatment steps.

The distribution of the containers to processing units connected in parallel can be determined spontaneously upon demand from respectively free processing units. In particular, when a processing process has no fixed processing period. This can be the case when a process is controlled by an inspection unit and the process must be performed until the inspection result is satisfactory, for example, when printing onto the containers in a separate print correction step.

As shown in FIG. 1, the production system according to the invention in a first embodiment 100 comprises multiple linearly linked processing units 1, 2, 3 for producing and/or treating containers 11, such as beverage bottles. The processing units 1, 2, 3 are for example a filling module, a closure module and a labeling module. Transfer interfaces 7-10 for transferring the containers 11 at module boundaries are further indicated. The processing units 1, 2, 3 can with the transfer interfaces 7-10 be linked together to guide the containers 11 in the form of a continuous product flow in a main direction of transport 11' consecutively through the individual processing units 1, 2, 3. The interfaces 7-10 are configured uniformly and/or with corresponding container entries and container exits such that replacement of the individual processing units 1, 2, 3 is possible without dismantling adjacent processing units. The processing units 1, 2, 3 can for this comprise, for example, uniform mounting points with respect to a predetermined mounting grid.

Figure 2:
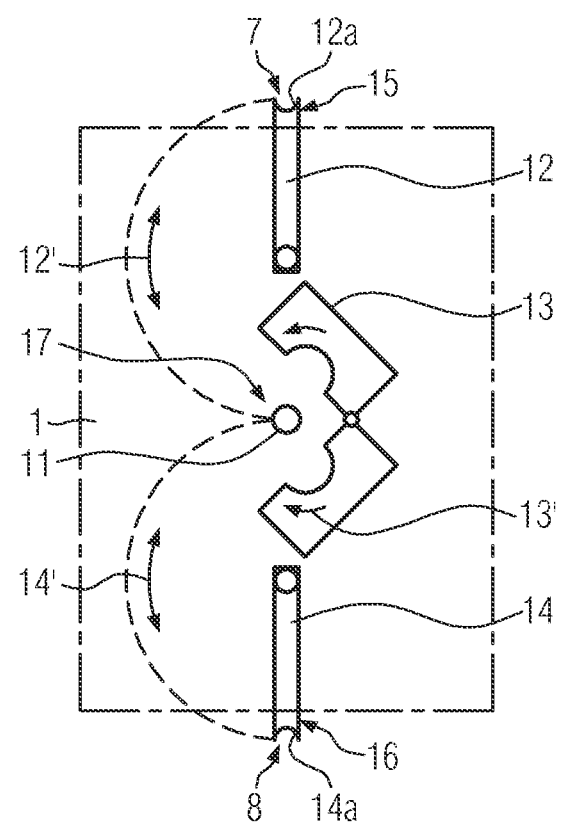
FIG. 2 shows a schematic plan view of a first embodiment of the processing unit according to the invention.

FIG. 2 schematically shows a processing unit 1 according to the invention in a first embodiment. According thereto, a handling device 12 on the entry side, an operating module 13 and a handling device 14 the exit side are provided. The handling device 12 on the entry side is shown in a gripping position 15 on the entry side for receiving the containers 11 at the container entry, i.e. in the region of the interface 7 on the entry side. Accordingly, the handling device 14 at the exit side is shown in a gripping position 16 on the exit side for transferring the containers 11 at the container exit, i.e. in the region of the interface 8 at the exit side. The handling devices 12, 14 at their free end comprise a preferably active gripper 12a, 14a.

The handling devices 12, 14 can be moved to a gripping position 17 in the region of the operating module 13 to transfer the containers 11 to the operating module 13 for the respective work step or to remove them therefrom. The handling devices 12, 14 can also hold or stabilize the container 11 there as needed in a suitable work position.

Containers within the meaning of the invention also comprise intermediates, in particular preforms for blowing plastic containers and grouped packages with several containers.

The handling devices 12, 14 are operated in a clocked manner, in particular such that the handling device 12 on the entry side is immediately after transfer of the container to the operating module 13 moved back to the gripping position 15 on the entry side. Accordingly, the containers 11 can immediately after processing in the operating module 13 be received by the handling device 14 at the exit side and moved to the gripping position 16 at the exit side. Temporally overlapping operation of the handling devices 12, 14 is thereby enabled, increasing the production capacity of the processing unit 1. The motion of the handling devices 12, 14 is illustrated by double arrows 12', 14' as a pivot motion. But a linear motion would also be possible.

The operating module 13 is stationarily mounted on the processing unit 1, as opposed to circulating operating modules in rotary machines. This is to be understood such that the operating module 13 performs only the motions 13' necessary for the respective work steps, for example, including opening and closing motions for loading and unloading. This is indicated schematically in FIG. 2 for the blow mold halves.

FIGS. 3A to 7E illustrate alternative embodiments 21, 21a-21d of the processing units, in which the containers 11 are handled with a combination of rail-like handling devices 22 and individually driven handling devices 24 running thereon with gripping arms 27 and grippers 28 mounted thereon. The rail-like handling devices 22 extend between the interfaces 25 on the entry side and the interfaces 26 the exit side and are therefore permanently allocated to the processing units 21, 21a-21d.

The handling devices 24 in the sense of vehicles, shuttles or the like running on the rail-like handling devices 22, for example, being magnetically driven, can be moved continuously between the interfaces 25, 26, i.e. between the container entry and the container exit of the processing unit 21, 21a-21d in the direction of arrow 24' and also beyond the interfaces 25, 26. The driven handling devices 24 are therefore only temporarily allocated to the processing units 21, 21a-21d. Accordingly, container transfer at the interfaces 25, 26 between adjacent rail-like handling devices 22 is omitted.

Preferably, more driven handling devices 24 are provided than processing units 21, 21a-21d with rail-like handling devices 22. The speed of the driven handling devices 24 can be selectively varied, for example, when treating the containers 11.

Figure 3A:
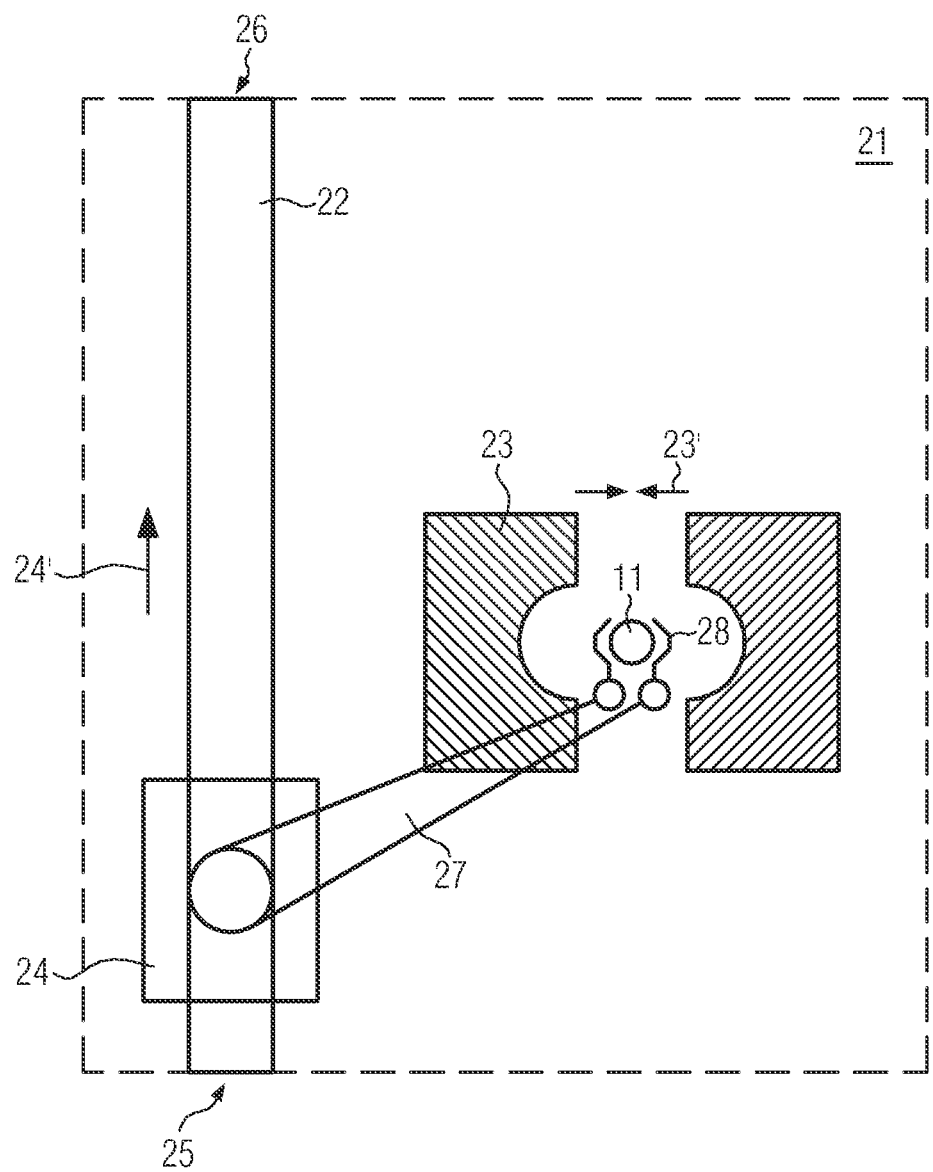
FIGS. 3A-3C show schematic plan views of a second embodiment of the processing unit according to the invention.

FIG. 3A shows a processing unit 21 with an operating module 23 comprising blow-mold halves moveable linearly in the direction of arrow 23' in a state during insertion of the container 11, presently a preform 23, into the operating module 23. The grippers 28 are there closed only in a positive-fit manner around the future neck region of the container 11 that is unchanged by the treatment, so that the latter can still rotate in the gripper 28. Accordingly, only the position of the container 11 is determined by the gripper 28, but not its rotational position. The container 11 can thereby be blown in a rotational position that is fixed in relation to the operating module 23, while the driven handling device 24 is moved on and the gripper 28 rotates about the container 11.

Figure 3B:
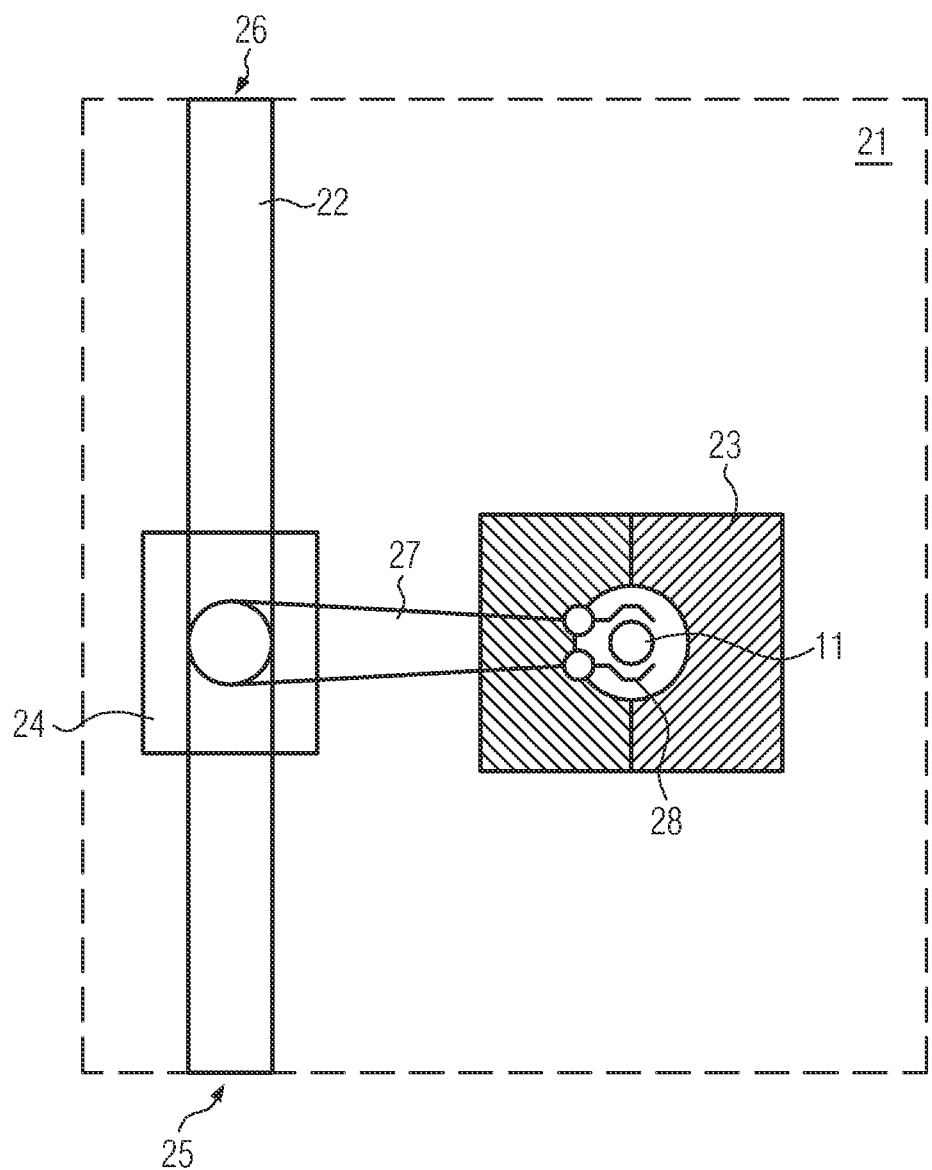

FIG. 3B shows a state during the work process in the processing unit 21. According thereto, the driven handling device 24 has moved on and the gripper 28 has rotated around the container 11. It can further be seen that the length of the gripping arm 27 and its rotational position on the handling device 24 has changed. Also shown is the optional rotatable mounting of the gripper 28 on the gripping arm 27. The gripping arm 27 is therefore both pivotable and telescopically adjustable or adjustable in length in other manners.

The positive-fit grip of the gripper 28 could, for example, be such that a permissible friction between the container 11 and the gripper 28 is just not being exceeded or loosened such that, for example, only a support ring formed on the container 11 contacts the gripper 28. The gripper 28 can preferably be actively adapted to the desired positive fit or force fit, for example, depending on the container guide and the required rotational positions of the container 11 in the operating module 23.

Figure 3C:
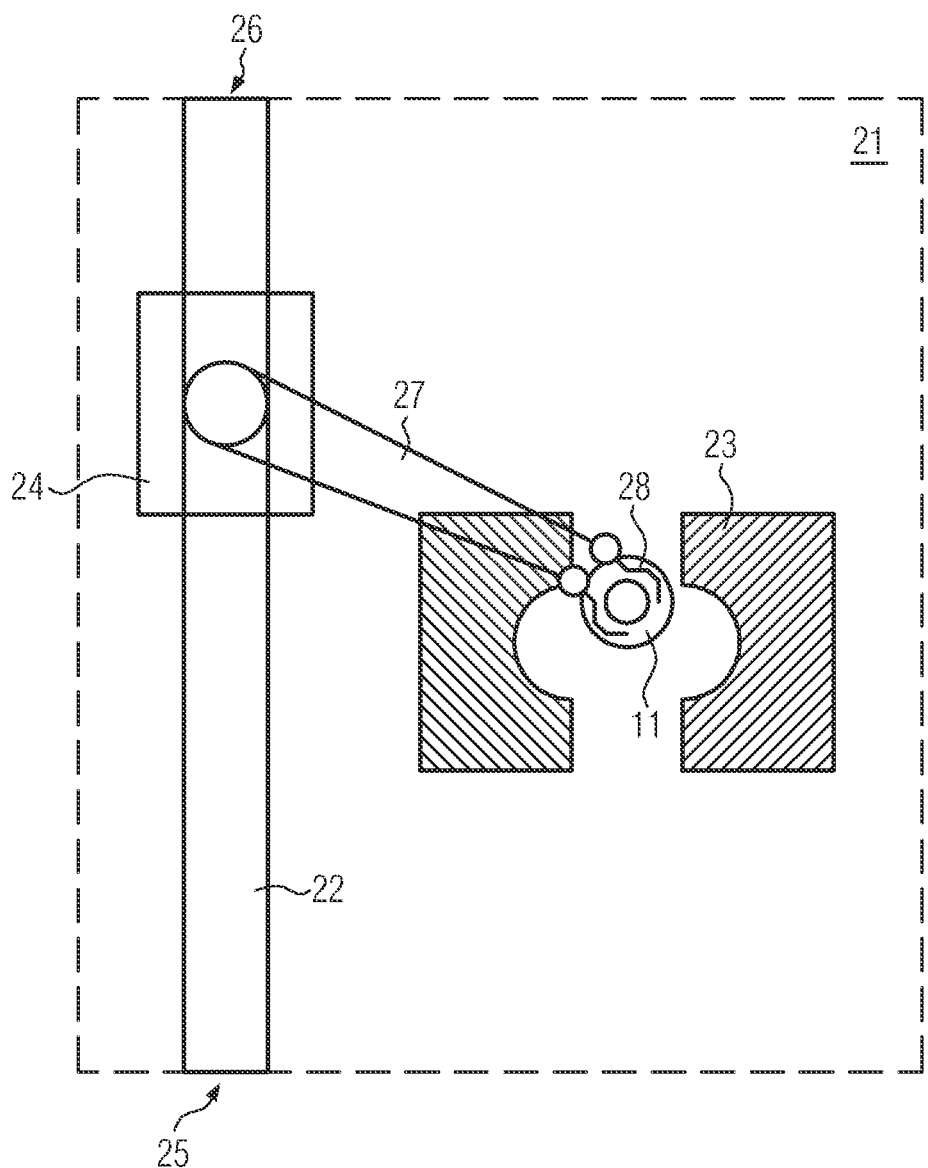

FIG. 3C shows a state during removal of the container 11, presently of the completely blow-molded container, from the operating module 23. The transport speed of the driven handling device 24 could then be increased until a state corresponding to FIG. 3A is reached in a subsequent processing unit 21.

The combination of rail-like and driven handling devices 22, 24 enables quasi-continuous operation in which, though the containers 11 are processed in a clocked manner in the operating modules, in particular in a temporarily stationary manner, the handling devices 24, however, are driven continuously, in particular, with varying speed while passing the operating modules 23.

Figure 4:
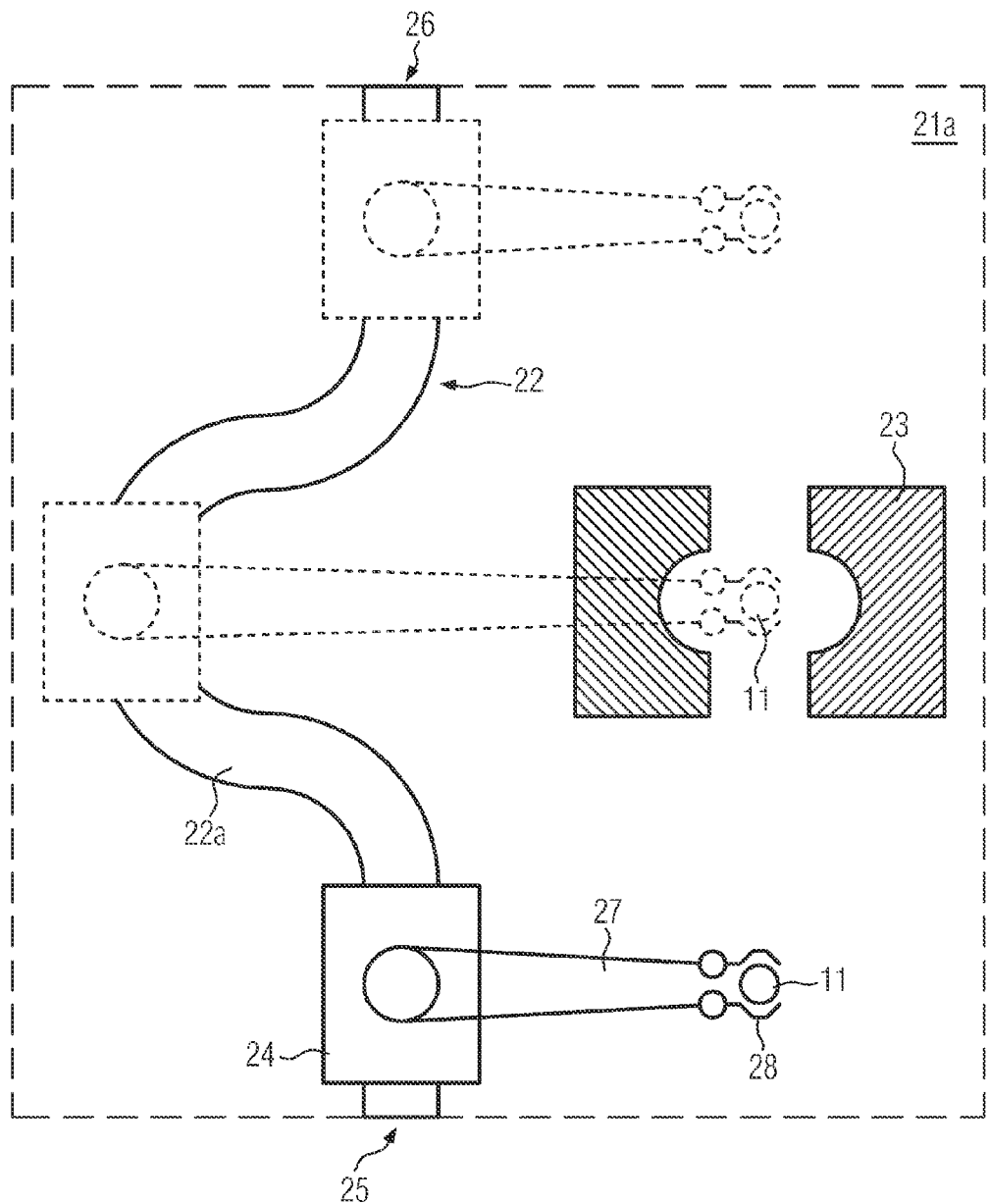
FIG. 4 shows a schematic plan view of a third embodiment of the processing unit according to the invention.

FIG. 4 shows a third embodiment 21a of the processing unit according to the invention in which the rail-like handling device 22 comprises a curved portion 22a which is in particular formed convex relative to the operating module 23. Pivoting the gripping arm 27 is then optionally dispensed with (see dashed positions), so that the driven handling devices 24 can be simplified. Otherwise, the same functions and processes can be realized as in the second embodiment.

Figure 5A:
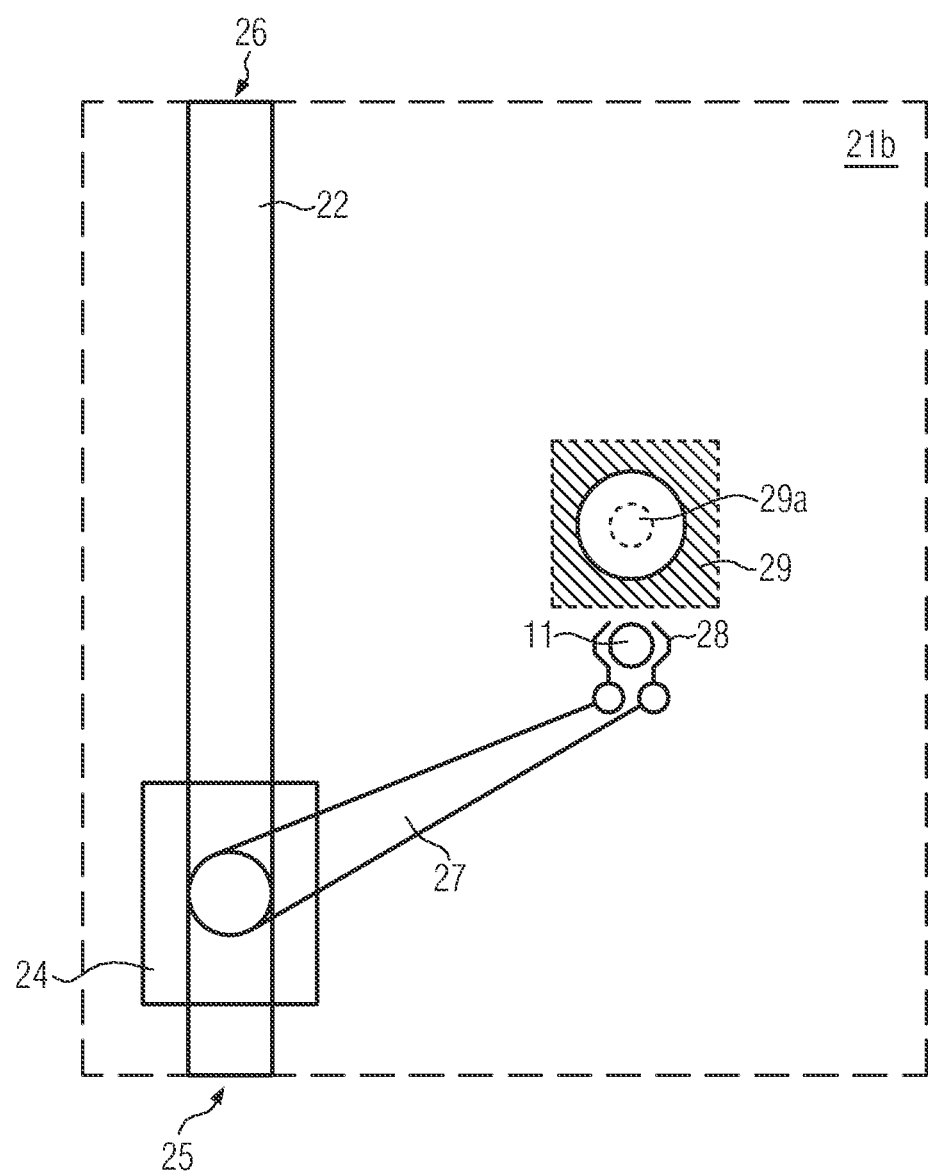
FIGS. 5A, 5B show schematic plan views of a fourth embodiment of the processing unit according to the invention.
Figure 5B:
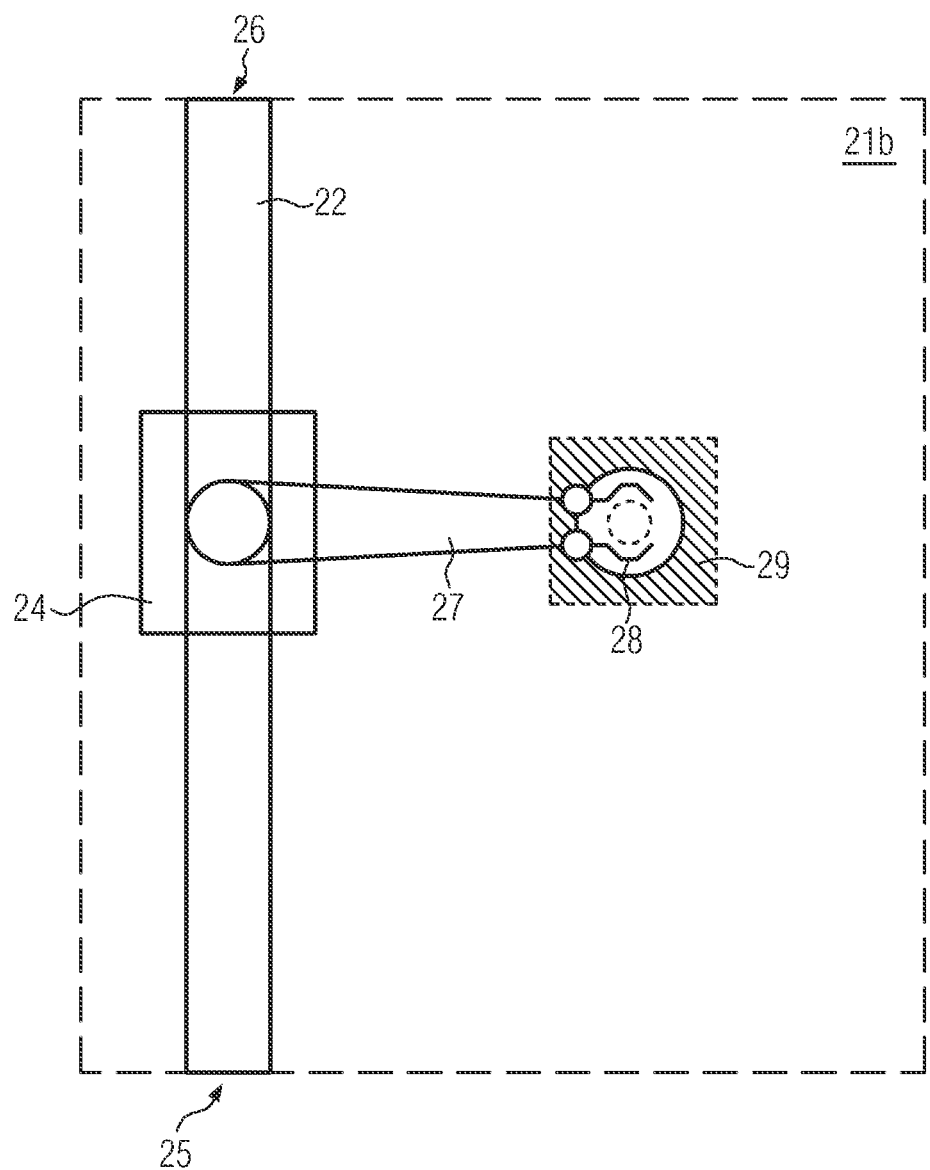

FIGS. 5A and 5B show a fourth embodiment 21b of the processing unit according to the invention which differs from the second embodiment 21 by a gripper 28 fixing the container 11 in a force-fit manner and by a different type of operating module 29, for example, a rinser with a rinser valve 29a or a filler. FIG. 5A shows a state when the container 11 is moved towards the operating module 29, FIG. 5B shows the container 11 positioned in the operating module 29. According thereto, the gripping arm 27 is mounted adjustable in length and pivotable. Also the gripper 28 is mounted pivotable at the gripping arm 27.

The gripper 28 is preferably actively controlled, so that, for example, when closing the container 11 in the operating module 29, a drive torque of the gripper 28 could be monitored in order to monitor or control the work step.

Figure 6:
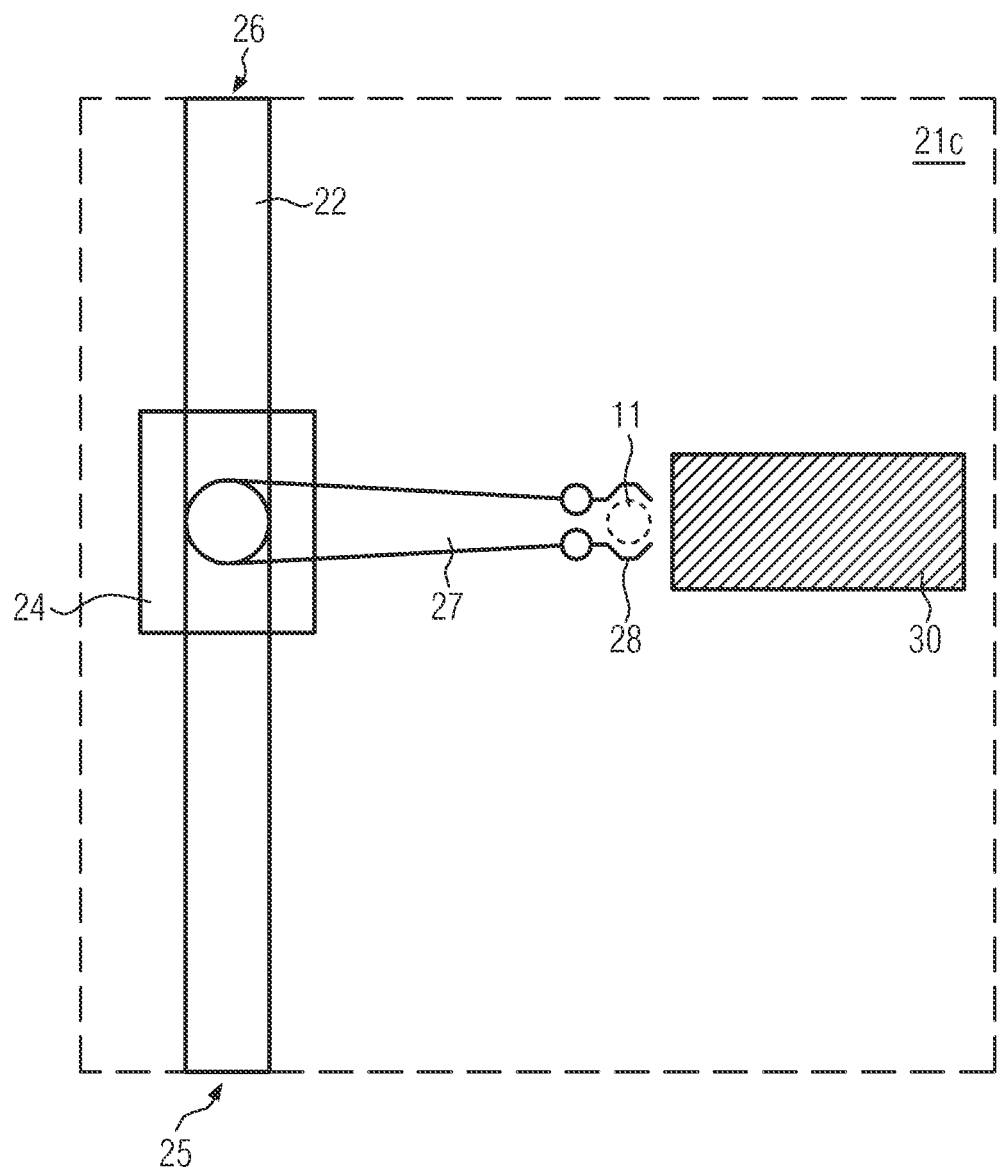
FIG. 6 shows a schematic plan view of a fifth embodiment of the processing unit according to the invention.

FIG. 6 shows a fifth embodiment 21c of the processing unit according to the invention, where the pivotal motion of the gripping arm 27 is used to rotate a side surface of the container 11 relative to an operating module 30, for example, of a detached labeling assembly or an assembly for direct printing. In this case, pivoting the gripper 28 relative to the gripping arm 27 can be dispensed with. Only its length of is to be adapted, for example by telescoping, to the transport motion of the driven handling device 24.

In this case, the container 11 is fixed in a positive-fit manner in the gripper 28 such that it rotates merely due to the pivotal motion of the gripping arm 27 and the side wall of the container 11 rolls off on the operating module 30. In order to realize the contact pressures needed for labeling, the container 11 can be held, for example, both in the neck region as well as in a lower side wall region or be supported by a counter support.

Figure 7A:
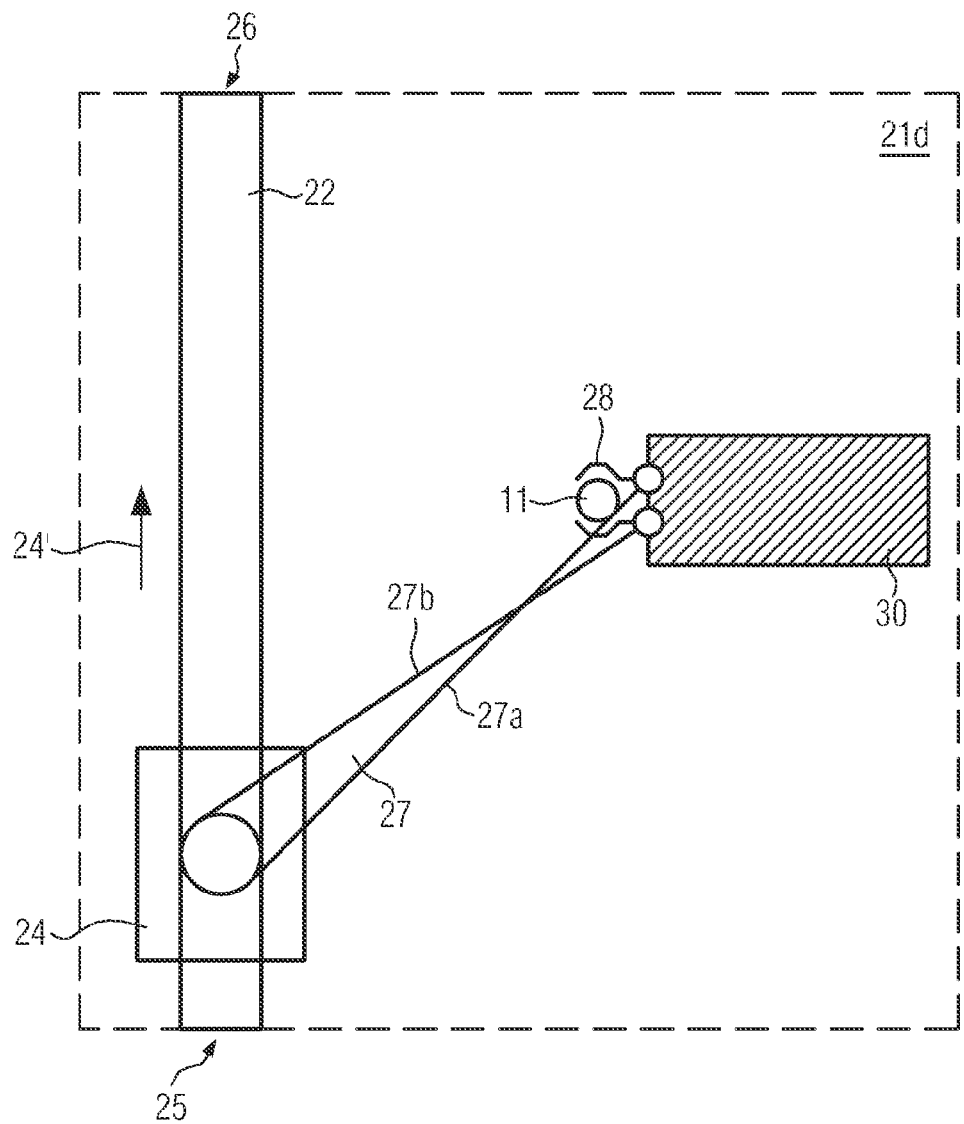
FIGS. 7A-7E show schematic plan views of a sixth embodiment of the processing unit according to the invention.
Figure 7B:
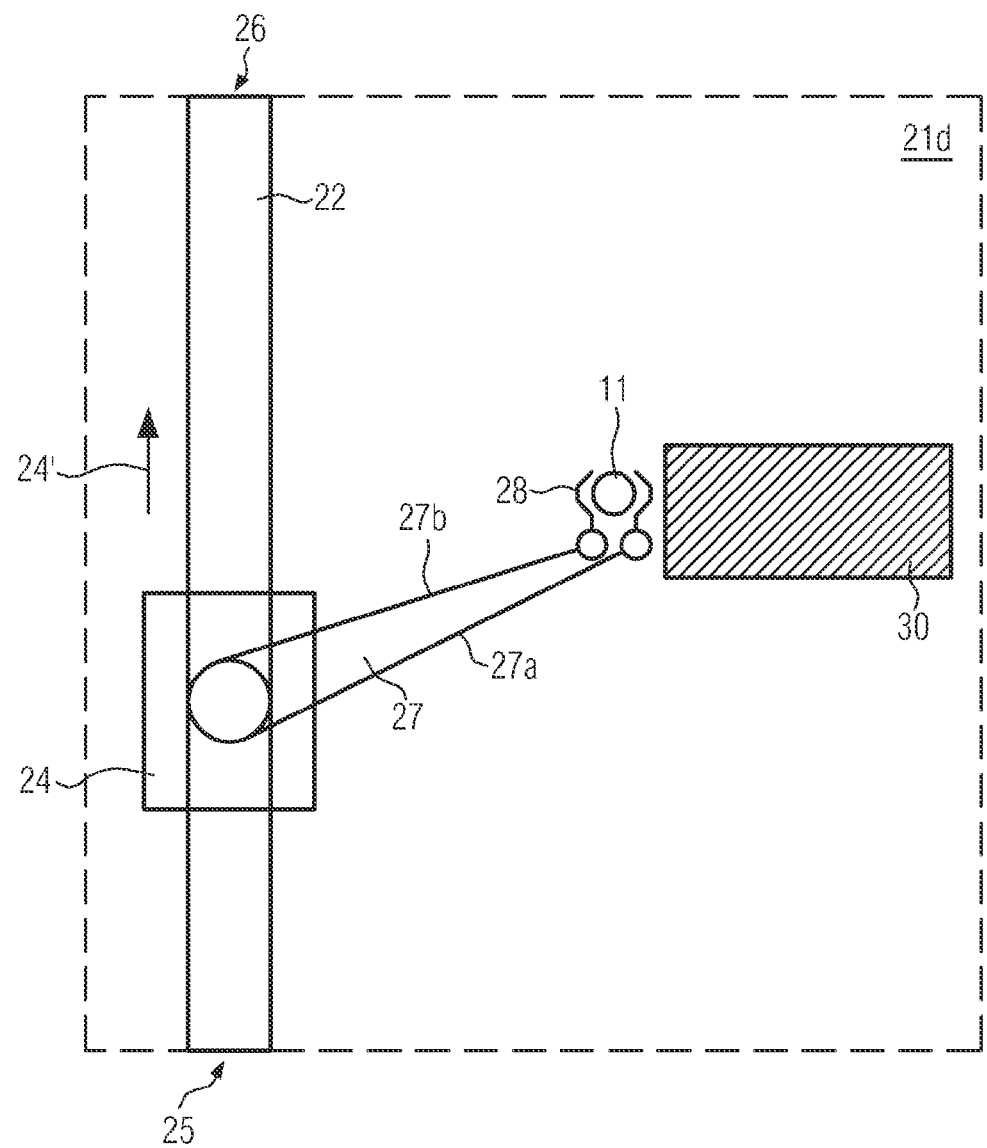
Figure 7C:
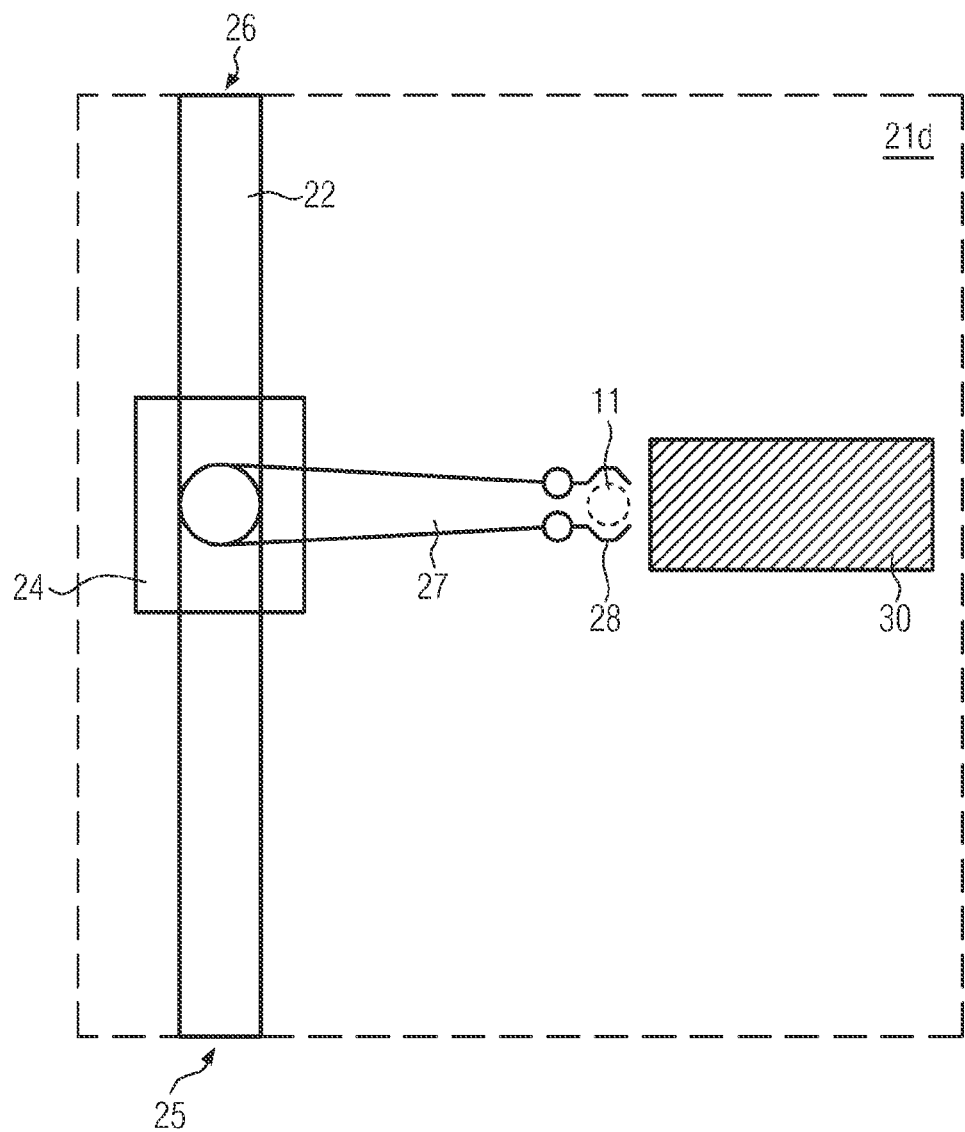
Figure 7D:
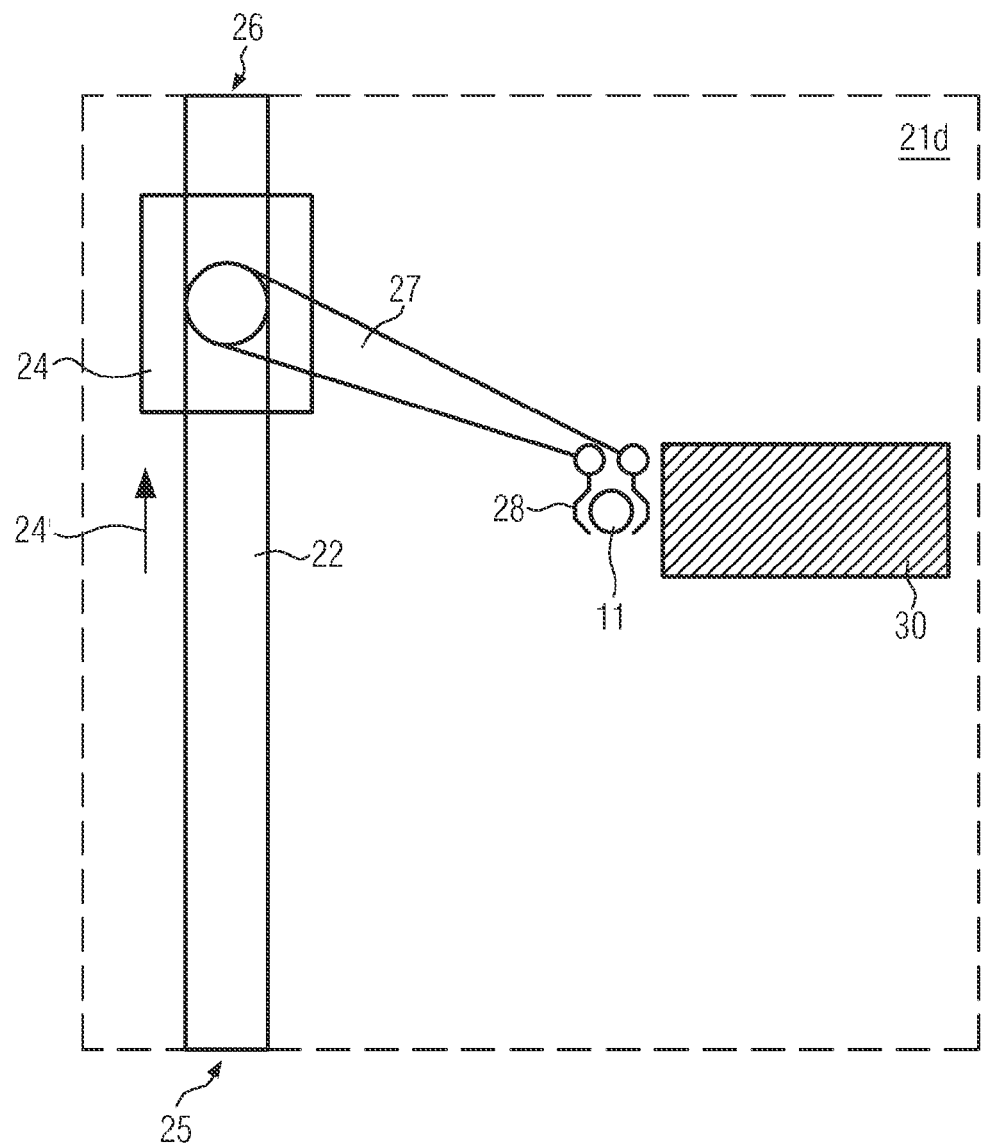
Figure 7E:
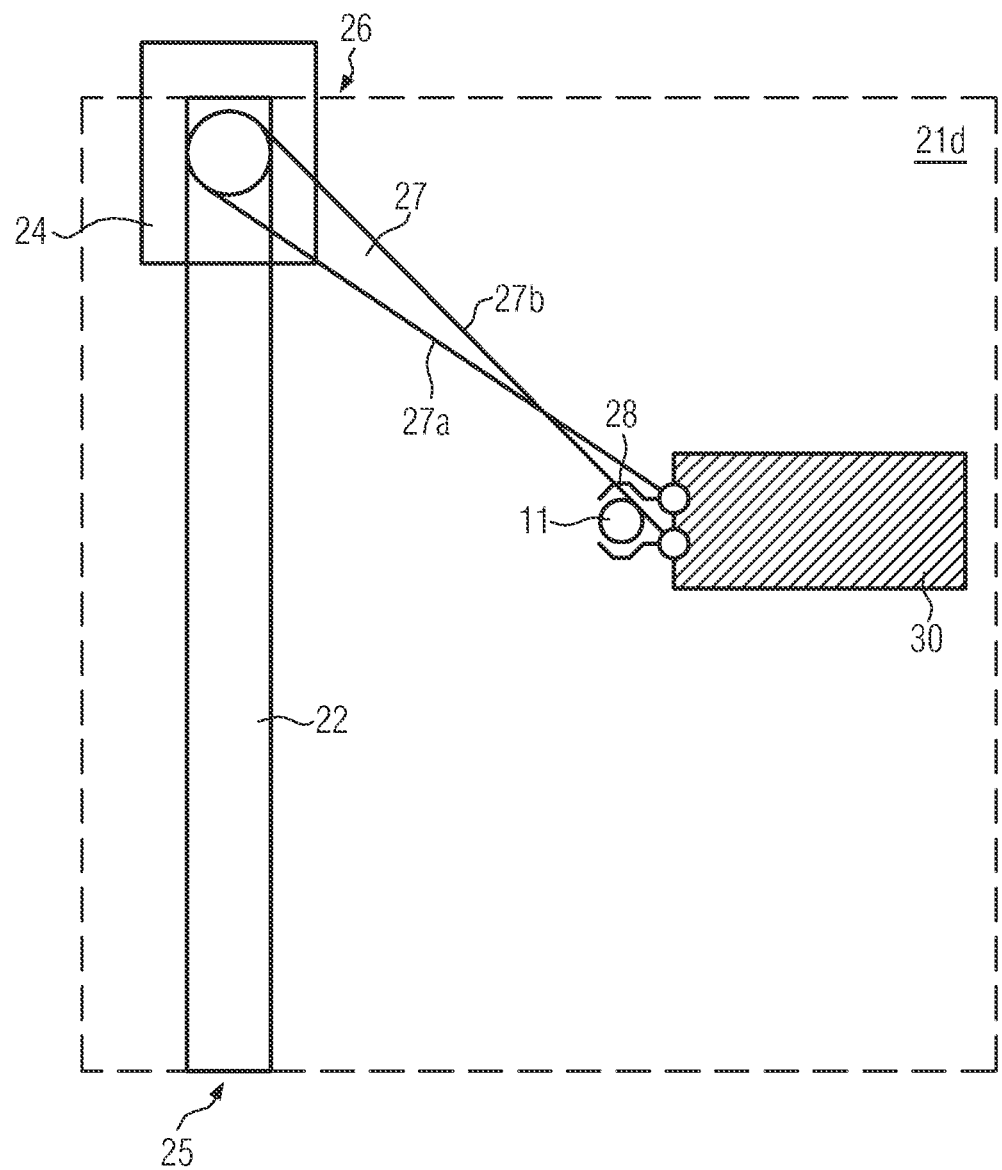

FIGS. 7A-7E show a sixth embodiment 21d of the processing unit according to the invention in which the pivotal motion of the gripping arm 27 is supported by a pivotal motion of the gripper 28 in order to totally rotate a side surface of the container 27 relative to an operating module 28, for example, of a detached labeling assembly or an assembly for direct printing. In this case as well, the container 11 is fixed in a force-fit manner in the gripper 28, so that its rotational position relative to the gripper 28 does not change. To illustrate the pivotal motions, the gripping arm 27 is shown schematically by the legs 27a, 27b intersecting in FIGS. 7A and 7E. FIGS. 7B to 7D by way of example illustrate intermediate positions of the driven handling device 24 and the gripping arm 27.

Rail-like and driven handling devices 22, 24 could also be advantageously used for preheating preforms. They could with the illustrated gripping arms 27 and grippers 28 be placed at different distances and/or rotational positions relative to radiators. So-called preferential heating could thereby be realized. Continuous or oscillating pivoting motions of the preforms to be heated could also be conceivable.

Having rail-like and driven handling devices 22, 24 eliminates the need for transferring the containers from gripper to gripper at the boundaries of the processing units The process time available for the actual treatment could thereby be extended. Due to the continuous gripping, in particular containers without support ring can be handled reliably by neck handling.

Figure 8:
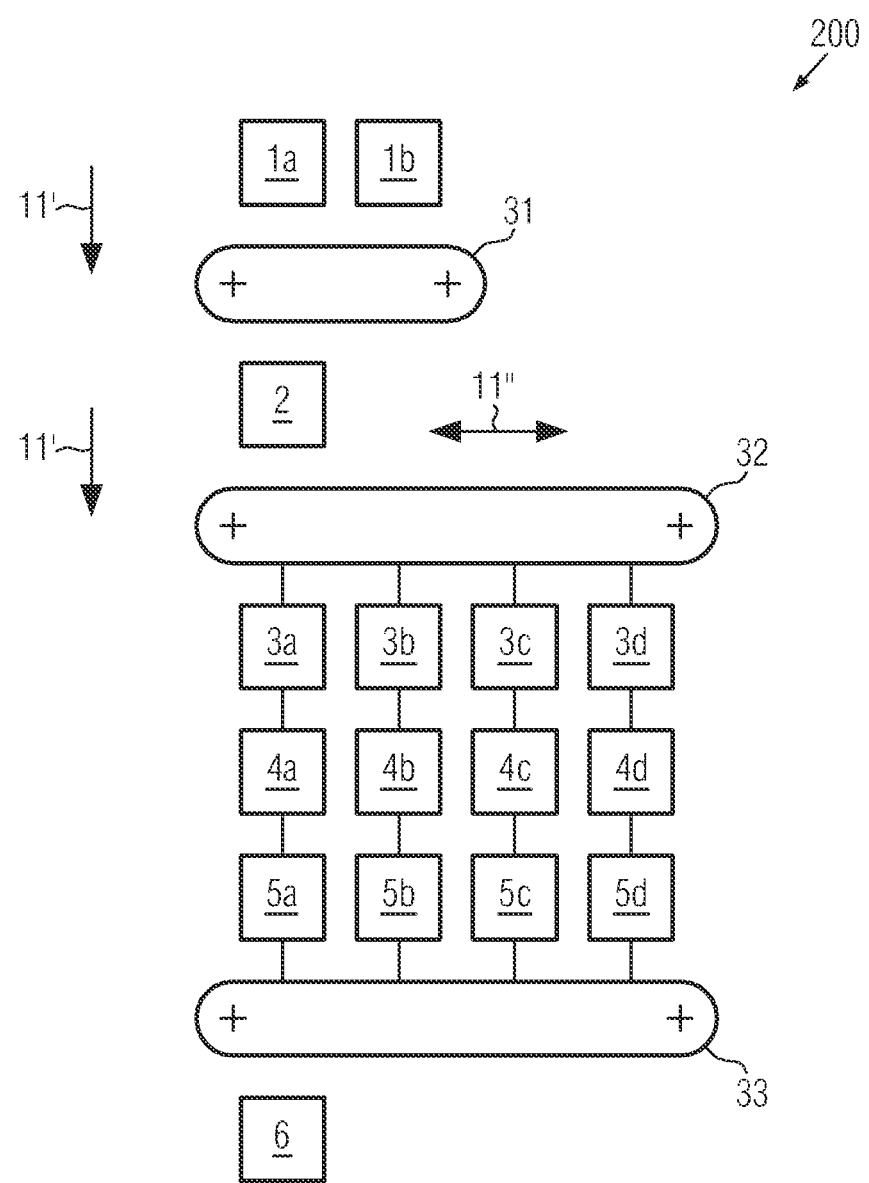
FIG. 8 shows a production system according to the invention with distribution modules for linking processing units in a schematic plan view.

FIG. 8 shows a particularly advantageous embodiment 200 of the production system according to the invention in which multiple processing units 3a-3d, 4a-4d and 5a-5d connected in parallel are provided for work steps with comparatively long work process periods, such as filling modules, closure modules, labeling/printing modules. For work steps with relatively short work process periods, only individual processing units 2, 6 are provided, for example, a blow module and a grouper module for collecting groups of filled containers. For a work step with a medium work process period, two processing units 1a, 1b are provided in the example, such as heating modules for preforms.

At interfaces, where the number of processing units connected in paralleled changes, distribution modules 31, 32, 33 are provided with which the respective product flows can be selectively distributed to partial product flows towards downstream processing units or partial product flows can be merged.

FIG. 8 illustrates that successive treatment of the containers in the processing units indicates a main direction of transport 11' of the containers 11 and the distribution of the containers 11 effected transverse thereto in the distribution modules 31, 32, 33 indicates a secondary direction of transport 11".

The unbranched connection of the processing units 3a, 4a, 5a in series for the respective partial product flows corresponds substantially to the first embodiment 100 illustrated in FIG. 1 with the interfaces 7-10. They are not shown in FIG. 8 for the sake of clarity. The interfaces 7, 10 would in the example of FIG. 8 establish the connection to the distribution modules 32, 33.

Figure 9:
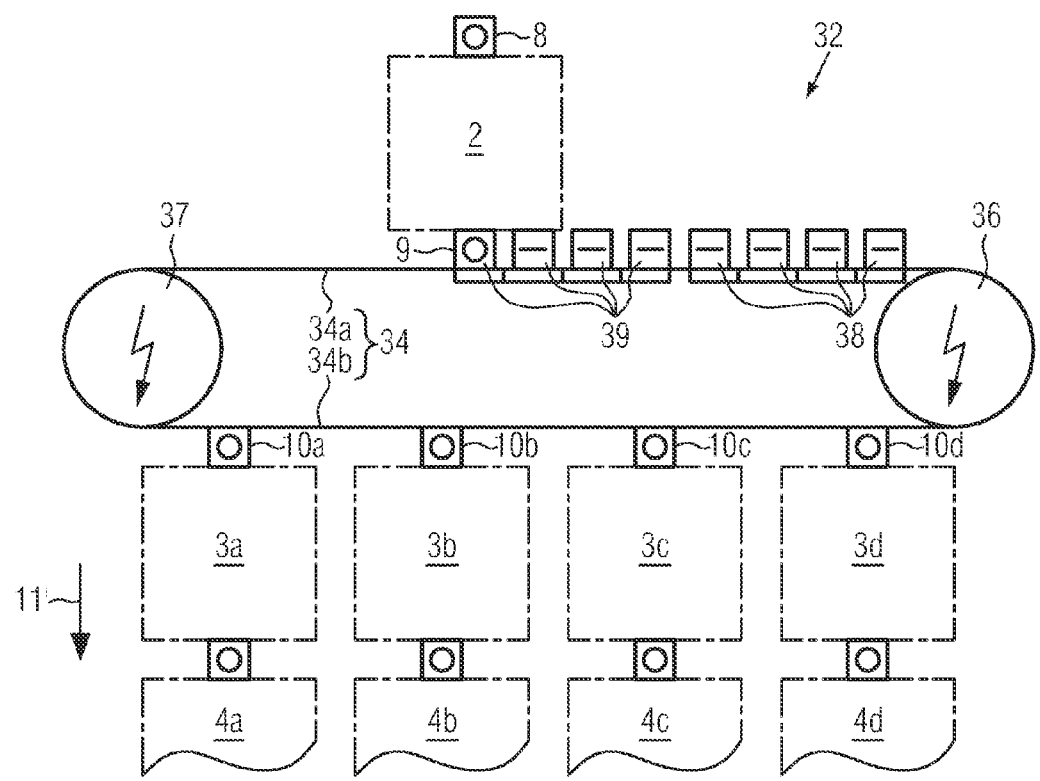
FIG. 9 shows a schematic plan view of a distribution module according to an embodiment of the invention.
Figure 10:
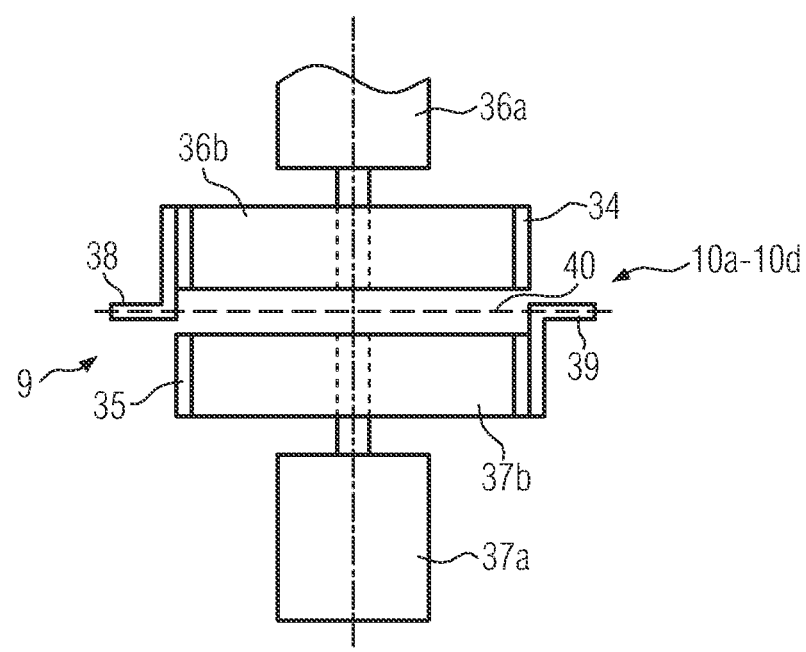
FIG. 10 shows a longitudinal sectional view through the distribution module.

As shown in FIGS. 9 and 10 in detail, the distribution modules 31-33 according to the invention comprise, for example, circulating transport devices 34, 35 substantially disposed one above the other, such as toothed belts, chains, or the like. They are driven individually by drive units 36, 37. Attached to the transport devices 34, 35 are rows of grippers 38, 39 which can be moved in groups respectively to transfer interfaces at the entry side and the exit side. The number of transfer interfaces at the entry side and the exit side depends upon the required product flow distribution. In the example of FIG. 9, a single transfer interface 9 at the entry side and four transfer interfaces 10a-10d at the exit side are shown.

FIG. 10 illustrates that the drive units 36, 37 comprise separately controllable motors 36a, 37a and separate drive wheels 36b, 37b. Furthermore, the grippers 38 of one transport device 34 and the grippers 39 of the other transport device 35 are for gripping the containers 11 formed at the same height level that is indicated in FIG. 10 by a dashed line 40. The grippers 38, 39 can therefore receive the container 11 in groups consecutively at the same interface 9 and transfer them at the same interfaces 10a-10d. If necessary, the grippers 38, 39 are conveniently adjustable in height.

The transport devices 34, 35 each form a run 34a at the entry side and a run 34b at the exit side (lower transport device 35 hidden in FIG. 9). As a comparison of FIGS. 9 and 10 reveals, the grippers 38, 39 can be positioned both simultaneously on the respective run at the entry side or the exit side as well as oppositely.

The following mode of operation can thereby for example be realized:

The relatively fast operating single processing unit 2 at interface 9 sequentially transfers containers 11 to the row of grippers 38 of the one transport device 34. The latter with the loaded grippers 38 sequentially moves to the interfaces 10a-10d at the exit side and there transfers one respective container 11 to an associated slower processing unit 3a-3d.

The other transport device 35 driven independently thereof can in the meantime be moved to interface 9 at the entry side to load its row of grippers 39 with containers 11. They can again immediately subsequently be moved to interfaces 10a-10d at the exit side in order to there transfer the containers 11.

A transition from multiple processing units operating comparatively slow to a smaller number of processing units operating comparatively fast is also similarly possible.

Flexible linkages in the main direction of transport 11' and distributions in the secondary direction of transport 11" can thereby with the distribution modules 31-33 according to the invention be combined.

Figure 11:
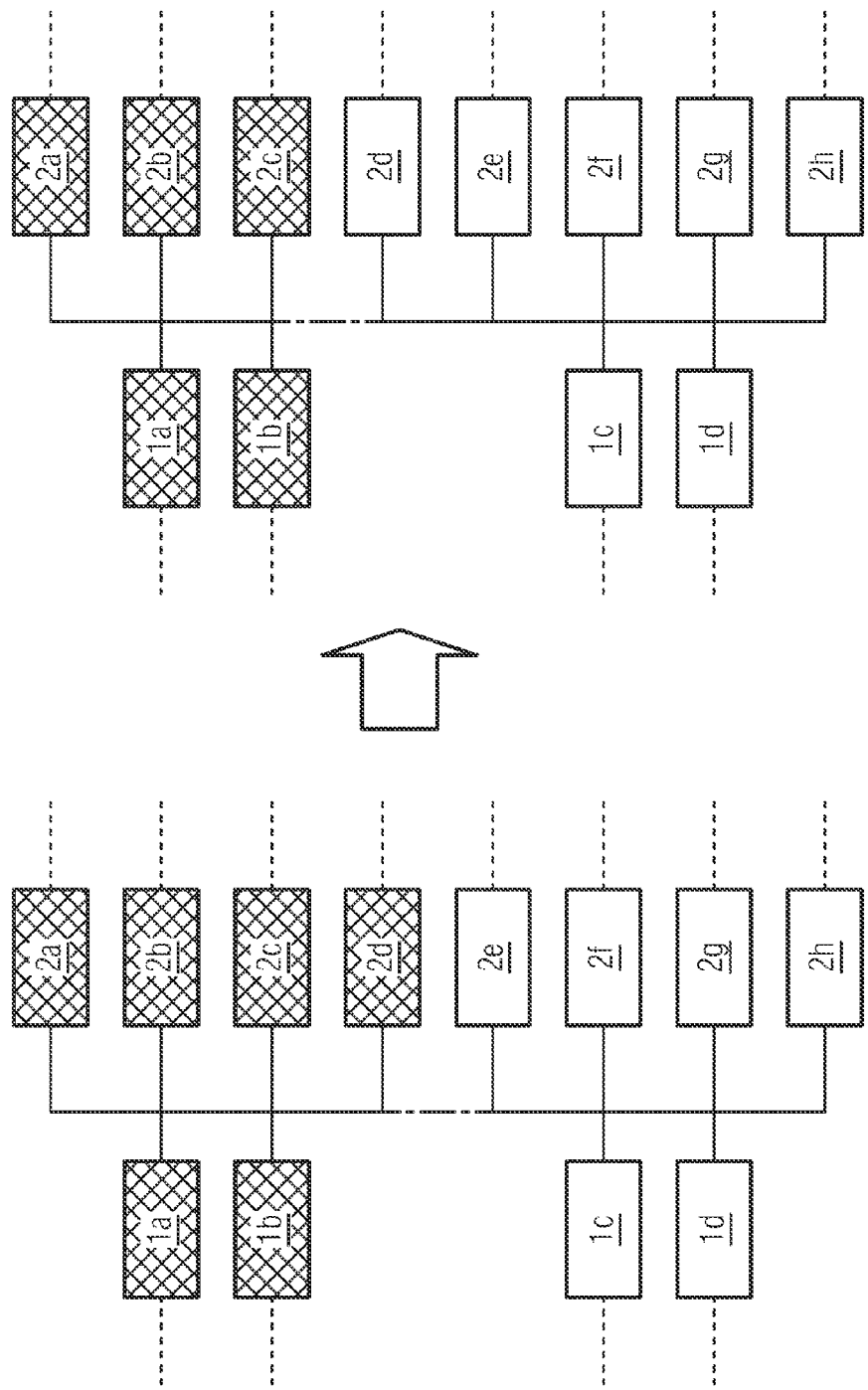
FIG. 11 shows a schematic representation of a method for adapting product flows through the production system according to an embodiment of the invention.

Different products, that do not differ in terms of their process periods, for example, differently colored products, can thereby be selectively distributed or merged in one product flow. Different products requiring different processing periods at processing units of the same kind, such as beverages that can be filled into containers at different speeds, can be combined and the product flow can overall according to the different process periods be distributed efficiently to the available capacities in the individual work steps. This is illustrated with reference to FIG. 11.

For example, first two parallel product lines for a first product (shaded rectangles) and a second product (empty squares) with similar properties can be processed in parallel with an equal number of treatment stations 1a, 1b, 2a, 2b, 2c, 2d and 1c, 1d, 2e, 2f, 2g, 2h in a first and a second work step. Following a product changeover, for example, the second product can in the first work step be processed significantly slower, for example be filled, than the first product. In this case, the capacity of the production system can possibly overall be better utilized, if in the example the processing unit 2d is for the subsequent second work step allocated to the second product, instead of to the first product. This is made possible by the distribution modules according to the invention.

Such changeovers can be advantageous, for example, when blowing containers of different sizes, when filling them with additional container sterilization or the like.

The products can there differ in shape and/or design of the container, in volume of the container, in the material of the container, in the degree of sterilization of the container in the manner of closure of the container, in the filled product, in the design of the label or direct print, in the number of labels, in the kind of packaging, such as a six-pack or a box, in the kind of preform, such as in terms of its weight and/or appearance, and in many other features and combinations of the aforementioned features. Accordingly, there can be a wide variety of process period combinations of the two systems in which flexible application and/or flexible allocation of individual modules can be advantageous.

Figure 12:
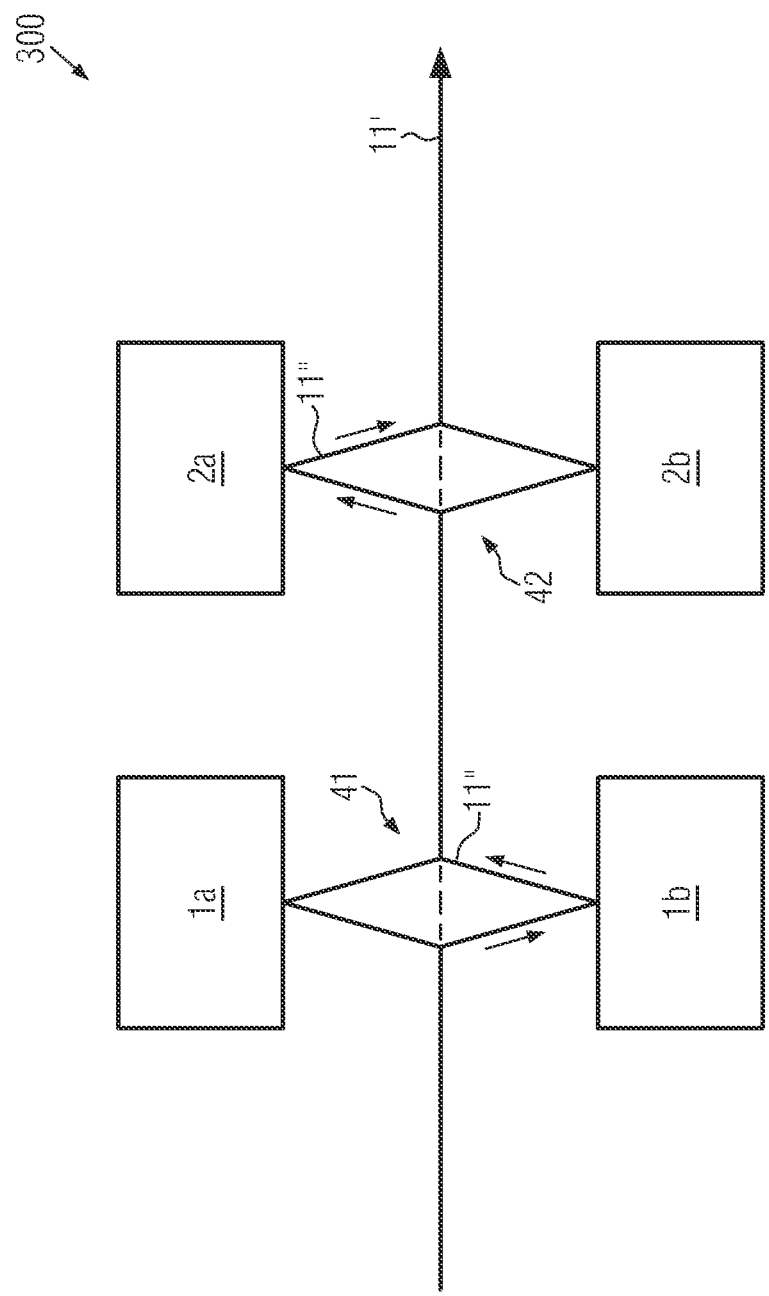
FIG. 12 shows a schematic representation of a production system with alternative product guidance.

Another possibility of making system operations more flexible while simultaneously reducing the costs for distribution modules is indicated schematically in FIG. 12 by a further embodiment 300 of the production system according to the invention. According thereto, transport of the containers 11 in the main direction of transport 11' does not pass through the respective processing units 1a, 1b, 2a, 2b but past them. The containers 11 are only diverted at distribution modules 41, 42 in the secondary direction of transport 11" to a processing unit when the latter is available. For example, processing units 1a, 1b could be intended for a first handling step and processing units 2a, 2b downstream for a second handling step. Similarly, processing units 1a, 1b, 2a, 2b could all can be intended for the same handling step. Identical distribution modules 41, 42 are the preferably used to further improve modularity of the production system.

Figure 13:
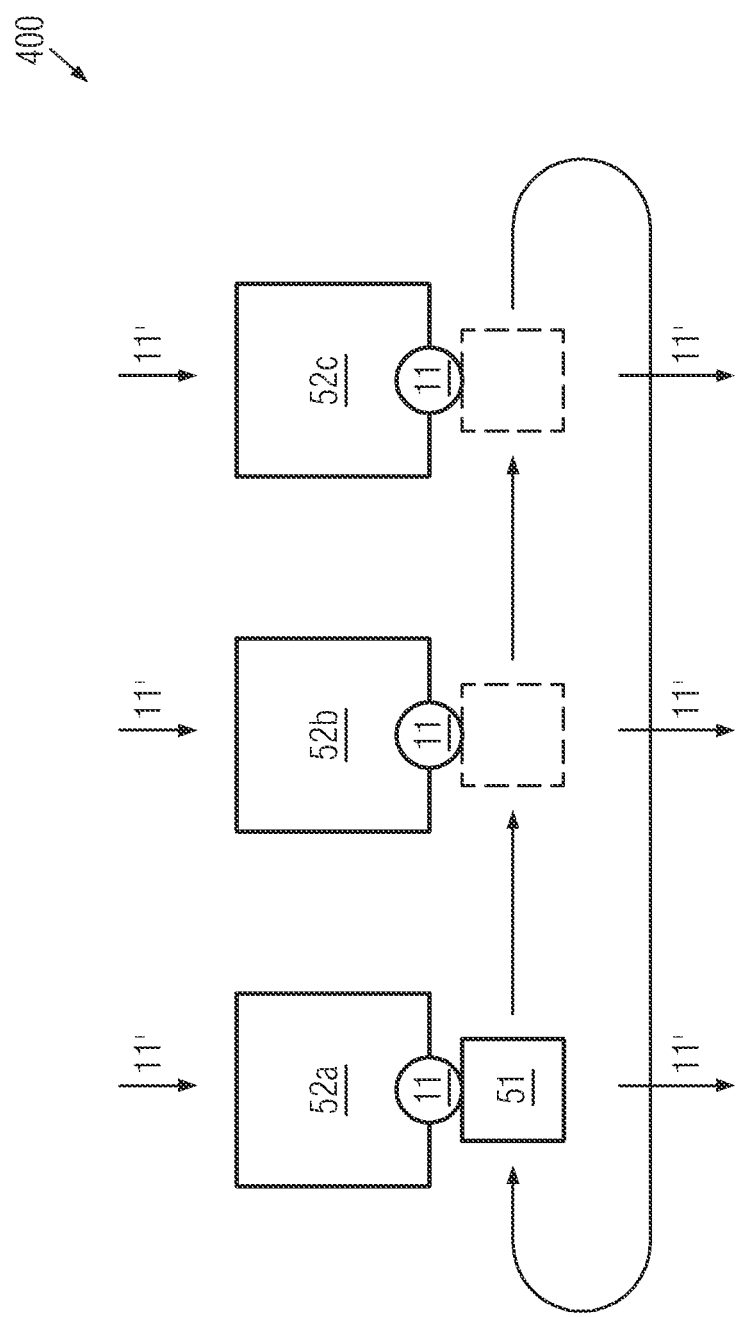
FIG. 13 shows a schematic representation of a production system with a mobile operating module.

Another option to improve capacity utilization of the production system according to the invention lies in a combination of stationary processing units with a comparatively long work process period with at least one mobile operating module for a comparatively shorter process. This is indicated in FIG. 13 by a further embodiment 400 of the production system according to the invention. For example, a mobile operating module 51 is configured such that it can be moved towards the containers 11 positioned in stationary processing units 52a, 52b, 52c in order to perform the shorter process during the longer process. It is here particularly desirable to have the mobile operating module 51 be allocated at least two stationary processing units 52a, 52b, 52c in succession. The number of assemblies required for the shorter process can thereby be reduced, as well as the space required for this.

This requires that the processes of the stationary processing unit 52a, 52b, 52c and the mobile operating module 51 be performed at different container portions, so that the work processes do not interfere with each other.

For example, successive labeling or printing onto multiple containers 11 with a mobile operating module is conceivable while the containers 11 are filled while each positioned at a filling valve.

The embodiments described can due to the modularity and uniform transfer interfaces be combined with each other and/or replaced in a particularly easy manner. In particular the distribution modules enable flexible capacity utilization in combination with a processing unit with work process periods of varying length.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A production system for at least one of producing and filling containers, the containers including beverage bottles, the production system comprising modular processing units, each of the modular processing units comprising:
    at least one stationary operating module configured to produce or process the containers; and
    handling devices configured to handle the containers between a container entry of the processing unit and a container exit of the processing unit and to position the containers in the operating module,
    wherein one of the handling devices is rail-like and extends from the container entry to the container exit, and wherein the processing unit is, at least temporarily, associated with at least one of the other handling devices which is separately driven and moveable along the rail-like handling device in a guided manner, the at least one separately driven handling device being configured to position the container in the operating module,
    wherein the at least one separately driven handling device is configured as a vehicle, and the rail-like handling device comprises a magnetic linear drive with a plurality of coils arranged on a rail for driving the vehicle,
    wherein at least two of the processing units are of a same kind, and the containers are specifically distributable to the processing units of the same kind,
    wherein at least two of the processing units are configured to perform different work steps, and
    wherein at least one distribution module is disposed between the processing units for the different work steps, a product flow formed by the containers being distributable with the at least one distribution module to at least two partial product flows or at least two partial product flows formed by the containers being mergeable by the at least one distribution module.

2. The production system according to claim 1, wherein the at least one separately driven handling device is configured to position the container in the operating module during the guided motion.

3. The production system according to claim 2, wherein the at least one separately driven handling device includes gripping units with gripping arms of variable length that are pivotably mounted.

4. The production system according to claim 1, wherein the at least one separately driven handling device includes gripping units with gripping arms, grippers being mounted pivotably on the gripping arms such that the gripping arms and the grippers are separately pivotable about axes of rotation that are parallel to each other.

5. The production system according to claim 1, wherein the at least one separately driven handling device includes gripping units including grippers configured to grip a neck portion of the containers with a positive fit such that a respective one of the containers being held is mounted rotatable about a longitudinal axis thereof in the grippers.

6. The production system according to claim 2, where the rail-like handling device is formed curve-like in a region of the operating module.

7. The production system according to claim 1, wherein the at least one distribution module includes two separately driven transport devices each having at least one row of grippers attached thereto for receiving and transferring the containers, the grippers of the two transport devices being moveable to identical interface positions so as to be respectively useable to receive and transfer from and to the processing units.

8. The production system according to claim 1, wherein the at least one distribution module includes two circulating transport devices each having at least one row of grippers attached thereto for receiving and transferring the containers, a respective run on an entry side of the transport devices and a respective run on an exit side of the transport devices being disposed one above the other such that the rows of grippers are successively moveable to identical interface positions.

9. The production system according to claim 1, further comprising a mobile operating module configured to perform a first work step with a predetermined work process period and to be consecutively coupled to the processing units to perform a second work step with a longer work process period than the work process period of the first work step such that the first work step is performed during the second work step consecutively for at least two of the containers.

10. A method for at least one of producing and filling containers, the containers including beverage bottles, in the production system according to claim 1, the method comprising:
    distributing containers from a processing unit for a first work step with a first work process period to multiple processing units for a second work step with a second work process period that is longer than the first work process period.

11. The method according to claim 10, further comprising:
    providing at least one first processing unit for the first work step with a first work process period and at least one second processing unit connected parallel to the at least one first processing unit for the first work step with a second work process period that is longer than the first work process period; and
    distributing the containers to the processing units for the second work step in a weighted manner depending on a process period so as to equalize a degree of capacity utilization of the processing units for the second work step.

\* \* \* \* \*